Nov. 14, 1939.　　　　J. LANE　　　　2,179,639
DIRECTION INDICATOR FOR AUTOMOBILES
Filed Feb. 20, 1939
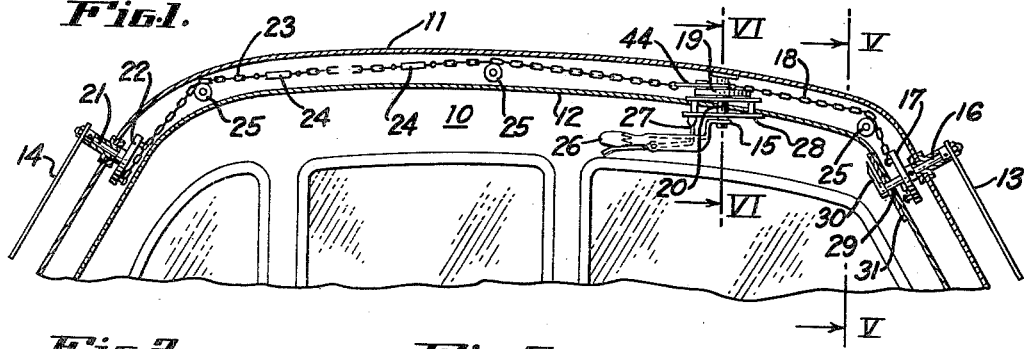
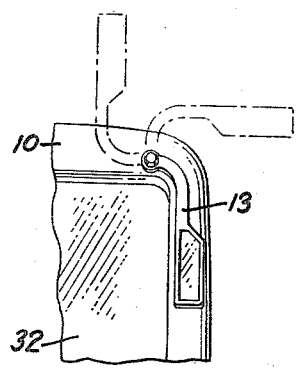
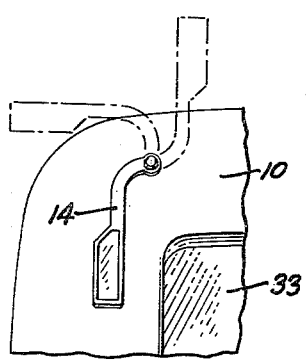
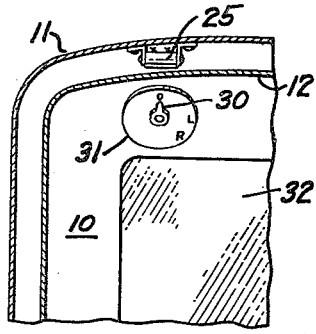
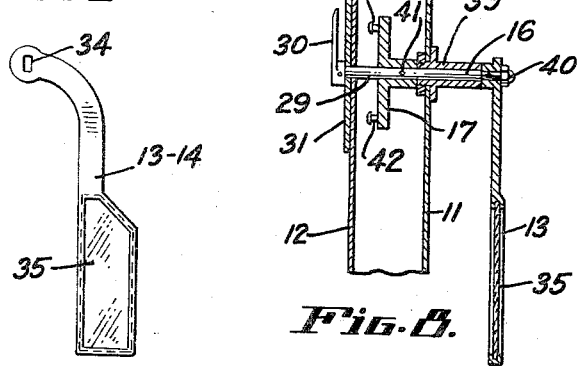
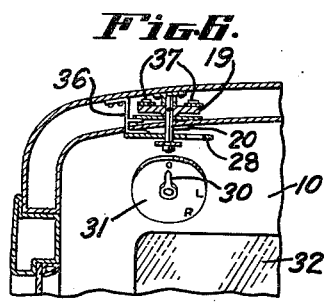
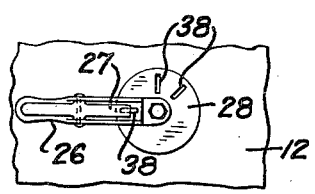
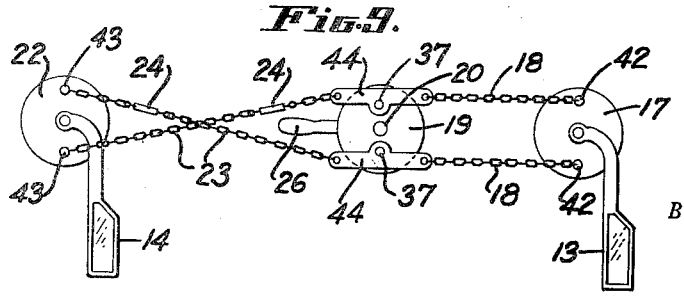
INVENTOR.
James Lane
BY
ATTORNEY.

Patented Nov. 14, 1939

2,179,639

UNITED STATES PATENT OFFICE 2,179,639

DIRECTION INDICATOR FOR AUTOMOBILES

James Lane, San Anselmo, Calif.

Application February 20, 1939, Serial No. 257,310

5 Claims. (Cl. 116—46)

My present invention relates to automobile signaling devices and more particularly to a signaling means for automobiles of the closed type in which there is provided front and rear semaphores that operate in unison to indicate to another driver the direction in which the automobile is to turn.

An object of the invention is to provide a simple, practical and convenient indicating means for automobiles of the closed body type.

Another object of the invention is to provide a signaling means for automobiles in which an indicating semaphore at the front of the automobile and a similar indicating semaphore at the rear of the automobile may be controlled in a simple and convenient manner to simultaneously produce similar signals.

Another object of the invention is to provide an indicating means in combination with a direction indicating semaphore which will indicate to an operator the position of said semaphore.

Another object of the invention is to provide a mechanically operating direction indicating signal employing a semaphore and an operating lever in which a driving connection between the operating lever and the semaphore is concealed between inner and outer walls of the automobile body.

Other objects and advantages of the invention will be in part pointed out hereinafter and in part evident to those skilled in the art as the description thereof proceeds.

In the drawing, wherein there is shown by way of illustration and not of limitation a preferred embodiment of the invention:

Figure 1 is a fragmentary vertical sectional view through the upper part of an automobile body showing a complete installation arranged in accordance with the invention, Figures 2 and 3 are respectively fragmentary front and rear views of the automobile body showing the signaling semaphore as in its neutral position and with the right and left turn indicating positions of the semaphore shown by dot and dash lines, Figure 4 is a detailed view showing a preferred form of semaphore, Figure 5 is a fragmentary sectional view taken along line V—V of Figure 1 looking in direction of arrows, Figure 6 is a fragmentary sectional view taken along line VI—VI of Figure 1 looking in direction of arrows, Figure 7 is a fragmentary view looking upwardly at the operating means as shown in Figure 1 of the drawing, Figure 8 is a vertical sectional view taken along the center line of the semaphore shown in Figure 1 as at the front of the automobile body, and Figure 9 is a diagrammatic view showing the manner of connecting the operating means with the front and rear signaling semaphores to produce a similar and simultaneous movement thereof.

For the purpose of illustration the invention is shown as applied to an automobile body 10 of the type having an all metal or so-called turret top. As here shown the automobile body 10 has an outer metal wall and roof forming portion 11 with an inner lining of finishing fabric or the like 12 spaced inwardly therefrom. The inner lining 12 in practice is secured to the automobile body by means of struts, not shown, that extend between the outer metal wall or roof forming portion 11 and the inner lining 12. With this type of car body it is possible to mount the elements which constitute the invention in such a manner that the driving connections therebetween will be concealed from view. As shown, the invention contemplates the provision of a semaphore 13 at the front of the car body and a second similar semaphore 14 at the rear of the car body between which there is mounted an operating means, designated generally by the numeral 15. As shown, the operating means 15 is secured to the roof of the car body 10 at a point immediately over the drivers seat. The semaphore 13 is mounted upon a shaft 16 that is journaled in the front wall of the car body. This shaft 16 carries a disc-like member 17 from which a chain connection 18 extends to the operating means 15. The chain connection 18 as shown connects the disc 17 with a second disc-like member 19 carried by a shaft 20 of the operating means 15. The semaphore 14 is mounted at the rear of the automobile body 10 upon a shaft 21 that carries a disc-like member 22 from which a driving connection in the form of chains 23 extend to the disc 19 upon the shaft 20 of the operating means 15. The chains 23 are shown as arranged in crossed relation and as having turnbuckles 24 therein for adjusting the relative positions of the semaphores 13 and 14 and maintaining a tight connection between the discs 19 and 22. As shown, the chain connection 18 and the chains 23 are arranged to run over rollers 25, but it is to be understood that instead of these rollers the chains may be encased in a suitable tubing or they may be merely threaded into openings provided in the ribs of the car body which support the inner lining 12.

The operating means 15 includes a lever arm 26 which carries a grip releasable latching means 27 that is adapted to engage detents provided upon a stationary plate 28 over which the latching means 27 moves as the lever 26 is moved by the operator to change the signaling position of the semaphores 13 and 14. In order that the operator may at all times have knowledge of the signaling positions of the semaphores 13 and 14 without having to observe the position of the lever 26 the shaft 16 upon which the semaphore 13 is mounted is projected through the inner wall 12 of the automobile body as at 29 and secured upon this projecting end 29 of the shaft 16 there is a pointer 30 that is adapted to cooperate with a dial plate 31 to thus indicate the signal being given. As shown, the dial plate 31 is preferably positioned upon the inner wall of the automobile body 10 so that it may be conveniently observed by the operator without distracting his attention from the highway ahead.

As shown in Figures 2 and 3 of the drawing, the semaphores 13 and 14 are arranged upon their respective shafts 16 and 21 in right and left hand relation so that when they are moved in unison a corresponding signal will be indicated at both the front and rear of the automobile. The semaphore 13 when in its off or neutral position will extend downwardly along one side of the windshield, designated by the numeral 32, at the front of the car body 10 while the semaphore 14 will extend downwardly alongside of the rear window, designated by the numeral 33, at the rear of the car body. When indicating a left turn the semaphores 13 and 14 will assume a substantially horizontal position and when indicating a right hand turn the semaphores 13 and 14 will assume a substantially vertical position, as shown by dot and dash lines in these figures of the drawing.

Upon referring to Figure 4 of the drawing, it will be noted that the semaphores 13 and 14 are provided with a squared or spline forming opening 34 by means of which they are attached to their respective supporting shafts. At their signaling ends these semaphores have a light reflecting surface 35 upon each side thereof. This surface may be in the form of a mirror or it may be of any other reflecting surface and will preferably be red in color. It is also conceivable that the semaphores 13 and 14 may be of box-like construction and provided with an enclosed illuminating lamp, if desired.

As illustrated in Figure 5 of the drawing, it will be seen that the pointer 30 with its dial plate 31 are positioned immediately over the upper left hand corner of the windshield 32 where the driver can observe same without losing sight of the highway ahead. As shown, the dial plate 31 has indicia thereupon with which the pointer 30 is adapted to cooperate to indicate the positions of the semaphores 13 and 14. This indicia comprises the letters "O" "L" and "R" which respectively indicate the "off", "left-turn" and "right-turn" positions of the semaphores. Provision for a stop signal is here deliberately omitted for the reason that the stop signal which is now provided for by law for all automobiles will serve this purpose.

As shown in Figure 6 of the drawing, the shaft 20 of the operating means 15 is mounted upon a supporting bracket 36 which also serves to support the stationary plate 28 with which the latching means 27 cooperates. At this point it will be noted that while the stationary plate 28 is disposed within the car body and below the inner lining 12, the disc-like member 19 is supported between the outer roof forming portion 11 of the car body and the inner lining 12. The disc-like member 19 is provided with oppositely disposed pins 37 with which the chain connections 18 and 23 are made, as will hereinafter appear.

In Figure 7 of the drawing, it will be noted that the dial plate 28 is provided with slots 38 with which the latching means 27 is adapted to cooperate. When the latching means 27 engages any one of the slots 38 of the plate 28 it will be understood that the lever 26 will be held in a position corresponding to a position of these slots and thus the semaphores 13 and 14 will be retained in the position to which they are last deliberately moved by the operator. If a change in signal becomes necessary, the operator will be required to release the latching means 27 and move the lever 26 to bring the semaphores 13 and 14 into the desired new indicating position.

As shown in Figure 8 of the drawing, the shaft 16 which carries the semaphore 13 is journaled in a bearing forming member 39 that is mounted upon the outer wall 11 of the car body. The semaphore 13 is secured to the end of the shaft 16 by means of a threaded nut 40. The disc-like member 17 is also secured by means of a pin 41 to the shaft 16 and at oppositely disposed positions this disc-like member 17 carries pins 42 to which the forward ends of the chains 18 are attached.

As shown in Figure 9 of the drawing, when the invention is applied to the automobile body 10 the pins 42 of the disc-like member 17 and the pins 37 of the disc-like member 19 together with similar pins 43 carried by the disc-like member 22 at the rear of the automobile body are held in corresponding positions with respect to each other by the connecting chains 18 and 23 so that when the disc-like member 19 is rotated about its shaft 20 by means of the lever 26 the semaphores 13 and 14 will move through equal and corresponding angles in the same direction, this latter result being obtained by crossing the chains 23 which connect the rear semaphore 14 with the operating means 15. In order to provide against interference between the chains 18 and 23 and the disc-like member 19 the pins 37 upon the disc-like member 19 carry oppositely disposed links 44 which extend outwardly beyond its periphery and move in parallel relation to each other when the disc-like member 19 is rotated. These links 44 engage the pins 37 at a point disposed inwardly from their longitudinal center and as a result it is possible to obtain a substantially 90° movement of the disc-like member 19 and at the same time maintain the chains 18 and 23 in a taut condition as provided for by the turnbuckles 24.

It is believed that the operation of the present invention will be apparent from the above description and, therefore, further amplification on this aspect of the invention should be unnecessary.

While I have, for the sake of clearness and in order to disclose my invention so that the same can be readily understood, described and illustrated a specific device and arrangement, I desire to have it understood that this invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In a semaphore signaling means for automobiles, the combination of an automobile body having a front wall extending at an angle to its top with a windshield opening therein, of a shaft extending outwardly through the front wall of the automobile body having a semaphore upon its outer end, means mounted upon the ceiling of the automobile body above the operator's seat having a driving connection with said shaft for controlling the position of said semaphore, and an indicating means associated with said first shaft located inside the automobile body adjacent its windshield opening, whereby the signaling position of said semaphore as controlled by said means upon the ceiling of the automobile body may be observed by the operator without distracting his attention from the highway ahead.

2. In a semaphore signaling means for automobiles, the combination of an automobile body having front and rear walls extending at an angle to its top, the front wall of said body having a windshield opening therein, of a shaft extending outwardly through the front wall of the automobile body adjacent the windshild opening therein having a semaphore upon its outer end, a second shaft mounted upon and extending through the rear wall of the automobile body and having a semaphore upon its outer end, operating means mounted upon the ceiling of the automobile body above the operator's seat having a driving connection with each of said shafts for controlling the positions of said semaphores, whereby said semaphores will be moved in unison to indicate similar signals at the front and rear walls of the automobile body, and an indicating means associated with said first shaft located inside the automobile body adjacent its windshield opening, whereby the signaling position of said semaphores as controlled by said operating means upon the ceiling of the automobile body may be observed by the operator without distracting his attention from the highway ahead.

3. In a semaphore signaling means for automobiles, the combination of an automobile body having front and rear walls extending at an angle to its top, the front wall of said body having a windshield opening therein, of a shaft mounted upon the front wall of the automobile body adjacent the windshield opening therein, a second shaft mounted upon and extending through the rear wall of the automobile body having a semaphore upon its outer end, operating means mounted upon the ceiling of the automobile body above the operator's seat for controlling the position of said shafts, a driving connection between said operating means and said shafts, whereby said shafts will move in unison in response to said operating means, and an indicating means associated with said first shaft located inside the automobile body adjacent its windshield opening and in front of the operator's seat, whereby the signaling position of said semaphore as controlled by said operating means upon the ceiling of the automobile body may be observed by the operator without distracting his attention from the highway ahead.

4. In a semphore signaling means for an automobile, the combination of an automobile body of the turret type having spaced outer and inner walls and a windshield opening at the front thereof, of a shaft extending through the front inner and outer walls of the automobile body, a semaphore secured upon the outer projecting end of said shaft, said shaft being extended inwardly to a point within the automobile body and having a pointer fixed thereupon, means secured upon said shaft providing oppositely extending lever arms positioned between the inner and outer walls of the automobile body, a rotatable member mounted in the top of the automobile body above the operator's seat and having oppositely extending lever arms located between the inner and outer walls thereof, means connecting the corresponding lever arms of said rotatable member and the lever arms upon said last means whereby rotation of said rotatable member will produce a corresponding rotation of said means, an operating lever for turning said rotatable member having a grip responsive detent to secure it in any desired position, and a dial plate having position indicating indicia thereupon located inside the automobile body adjacent its windshield opening and adapted to cooperate with the pointer upon said shaft, whereby the signaling position of said semaphore as controlled by said last means may be observed by the operator without distracting his attention from the highway ahead.

5. In a signaling means for an automobile, the combination of an automobile body of the turret type having spaced walls forming the top, front and rear ends thereof, of a shaft extending through the outer wall at the front end of the automobile body, a semphore secured upon the projecting end of said shaft, a second shaft extending through the outer wall at the rear end of the automobile body, means secured upon said first shaft and located between the inner and outer walls of the automobile body at the front end thereof for turning said shaft, means mounted upon said second shaft and located between the inner and outer walls at the rear end of the automobile body for turning said second shaft, an operating member mounted between said first and second shafts above the driver's seat and having a connecting portion disposed between the inner and outer walls of the top of the automobile body, a direct driving connection between said connecting portion of the operating member and the means upon said first shaft, a reverse driving connection between said connecting portion of said operating member and the means upon said second shaft, whereby movement of the connecting portion of said operating member will impart a corresponding forward and reverse rotation to said first and second shafts and cause said semaphores to produce corresponding indications, and means for supporting said driving connections out of contact with the inner and outer walls of the automobile body.

JAMES LANE.